United States Patent [19]

Dunn et al.

[11] Patent Number: 4,824,686

[45] Date of Patent: Apr. 25, 1989

[54] ANTIMICROBIAL ADDITIVES FOR COMPOUND ANIMAL FOODSTUFFS

[75] Inventors: Michael Dunn, Sutton; David A. Parker, Hull, both of England

[73] Assignee: BP Chemicals Limited, London, England

[21] Appl. No.: 175,622

[22] Filed: Mar. 29, 1988

Related U.S. Application Data

[63] Continuation of Ser. No. 914,263, Oct. 2, 1986, abandoned.

[30] Foreign Application Priority Data

Oct. 10, 1985 [GB] United Kingdom ................ 8525061

[51] Int. Cl.$^4$ .......................... A23L 3/34; A23L 3/36; A21D 4/00; C09K 15/04
[52] U.S. Cl. .................................... 426/532; 426/335; 426/805; 426/807; 422/28; 422/32; 252/380; 252/399; 252/407; 424/DIG. 8
[58] Field of Search ................... 426/53, 805, 54, 807, 426/535, 532, 630, 635, 636, 807, 319, 320-321, 335; 422/28; 252/407, 400.1, 397, 398, 380; 424/DIG. 8, 405, 410, 438, 439, 442

[56] References Cited

U.S. PATENT DOCUMENTS

| | | | |
|---|---|---|---|
| 3,595,665 | 7/1971 | Huitson et al. | 99/8 |
| 3,928,620 | 12/1975 | Courtade et al. | 426/532 |
| 4,115,591 | 9/1978 | Noda et al. | 426/532 |
| 4,199,606 | 4/1980 | Bland | 426/331 |
| 4,247,569 | 1/1981 | Hata et al. | 426/532 |
| 4,285,972 | 8/1981 | Chou et al. | 424/326 |
| 4,308,293 | 12/1981 | Tribble et al. | 426/532 |
| 4,338,343 | 7/1982 | Vidal et al. | 426/335 |
| 4,350,709 | 9/1982 | Vidal et al. | 426/320 |
| 4,421,774 | 12/1983 | Vidal et al. | 426/335 |
| 4,426,396 | 1/1984 | Young | 426/335 |

FOREIGN PATENT DOCUMENTS

| | | |
|---|---|---|
| 2318446 | 10/1974 | Fed. Rep. of Germany . |
| 1160430 | 8/1969 | United Kingdom . |
| 1257123 | 12/1971 | United Kingdom . |
| 1481961 | 8/1977 | United Kingdom . |

OTHER PUBLICATIONS

Hawley, G. 1981, The Condensed Chemical Dictionary, 10th edition, Van Nostrand Reinhold, Co. New York, pp. 476, 862.

Primary Examiner—Howard J. Locker
Attorney, Agent, or Firm—Brooks Haidt Haffner & Delahunty

[57] ABSTRACT

The present invention relates to animal feed preservative compositions containing a binary blend of formic acid and propionic acid, the amount of propionic acid in the blend being from 1-25% w/w of the total blend. Surprisingly, the proposed blend is more effective at controlling salmonella, especially in poultry, than formic acid when used alone.

10 Claims, No Drawings

ANTIMICROBIAL ADDITIVES FOR COMPOUND ANIMAL FOODSTUFFS

This application is a continuation, of application Ser. No. 06/914,263, filed Oct. 2, 1986, now abandoned.

The present invention relates to a blend of aliphatic carboxylic acids suitable for use as antimicrobial additives to compound animal feedstuffs.

It is well known that $C_1$-$C_4$ aliphatic carboxylic acids have anti-mold activity and have therefore been used as preservatives for crops and animal feedstuffs. For instance our earlier UK Patent specification No. 1160430 claims and describes the use of one or more of formic acid, acetic acid and propionic acid for inhibiting mold growth in crops. In this publication where a blend containing propionic acid is used, the amount of propionic acid present in the blend is at least 30% by weight of the total acid content thereof. It is also well recognised that formic acid is a poor mold inhibitor whereas propionic acid is a comparatively less effective antibacterial agent.

The performance prediction of acid mixtures in terms of the performance rating of the individual acids would present no difficulties if the storage period attainable with each acid were directly proportional to the weight of acid applied in treatment. In fact the relation between level applied and storage time is not linear and this leads to difficulties in determining whether synergism exists or not.

It has now been found that by using a specific blend of formic acid and propionic acid, a surprising degree of synergism is observed in respect of both their anti-mould and antibacterial activity when compared with the corresponding activity of the acids when used alone or the expected additive effect from their known respective activities.

Accordingly, the present invention is a preservative composition for animal feedstuffs said composition comprising a binary blend of formic acid and propionic acid characterised in that the amount of propionic acid in the blend is from 1-25% by weight of the total blend.

The binary blend suitably contains from 5 to 25% by weight of propionic acid, preferably from 10 to 23% by weight of propionic acid.

The preservative composition may contain in addition to the blend other components e.g. to improve the taste of the compound animal feedstuff in which it is used.

Typically, the preservative composition contains formic acid, propionic acid and water in a proportion of 68:20:12 respectively by weight. This corresponds to a formic acid to propionic acid ratio of 77.3:22.7% by weight.

Thus, the preservative compositions may be applied to the feedstuff to be preserved in the form of an aqueous solution of the blend. Alternatively the blend can be impregnated on a solid carrier such as e.g. silica and then mixed with the feedstuff to be preserved.

The amount of the blend applied to the feedstuff to be preserved is suitably from 0.1-10%, preferably from 0.2-5% by weight of the total feedstuff.

The compound animal feedstuff to which the preservative composition is applied may be in the pelleted or mash form. The preservative compositions containing the blends of the present invention may be applied to pig feed, cattle feed or poultry feed. Poultry in particular are susceptible to salmonella infection from the feed and the compositions of the present invention are especially suited to mitigating the effects of salmonella in such feeds. Typically, the animal feed composition will have the following composition:

|  | w/w % |
| --- | --- |
| Cereals and by-products | 50–80 |
| Vegetable proteins | 0–30 |
| Animal proteins | 0–15 |
| Miscellaneous | 0–25 |

The use of blends of the present invention for preserving compound animal feedstuffs is illustrated below with reference to the following Examples.

EXAMPLES AND COMPARATIVE TESTS
(Experiments 1 and 2)

In all the Examples and Comparative Tests the additives tested, whether single components or blends, the method of testing used and the preparation of the feeds was as shown below. Any deviation from this procedure is indicated as suitable or desirable.

A. Additives Tested

| Additive | % w/w Composition |
| --- | --- |
| (a) BioAdd* | 85% formic acid in water |
| (b) BioAdd* Blend | 80 - BioAdd* |
|  | 20 - Propionic Acid |
| (c) Sulphuric Acid Blend | 40 - Sulphuric Acid |
|  | 40 - Water |
|  | 20 - Propionic Acid |
| (d) Propionic Acid |  |

*Registered Trade Mark.

B. Method

The method used for testing activity of inhibitors is that propounded by Dixon, R. C. et al in Poultry Science, 60, 2182–2188 (1981), which relies on the measurement of $CO_2$ produced as a result of fungal respiration. Unlike visible mold growth which appears sometime after the initial events of fungal growth, $CO_2$ is a primary product of metabolism which can be easily and accurately determined without disturbing the feed and is applicable to measurements under controlled conditions of moisture and temperature.

Basically the method involves the measurement of $CO_2$ contained in the head space gas above moist compound feed stored in sealed containers.

The method was slightly modified from that described by Dixon et al and was then used to compare the preservative activity of the various acid mixtures.

C. Preparation of the Feed

Feed (Sow Care Gold Meal ex BOCM) was passed through a knife mill fitted with a 1 mm screen. Portions (100 g) of the feed were remoistened to 20% w/w moisture content and the test additive added. The whole was thoroughly mixed and then transferred to a 500 ml Winchester bottle which was then sealed by a rubber septum and a screw gap. (The screw cap had approximately a 5 mm diameter hole to facilitate withdrawal of gas samples). The bottles were rolled for 10–15 minutes on a set of motorised rollers. Triplicate samples at three treatment levels were used for each test additive and all samples were stored at 23° C.

D. Analysis of Head Space Gas 0.5 ml samples of head space gas were taken daily using a syringe and analysed for $CO_2$ by gas chromatography. Details of the GC operating conditions are shown below.

- Instrument—Packard 437 Chromatograph fitted with a thermal conductivity detector.
- Column—2 m×⅛" OD stainless steel packed with 80–100 mesh Porapack N
- Oven temperature—80° C.
- Injection block temperature—100° C.
- Helium flowrate—20 ml min$^{-1}$
- Detector—Filament temperature 280° C.
- Sample—0.5 ml using gas syringe Areas were measured by electronic integration using a Hewlett Packard Integrator.

Calibration was by external standard of $CO_2$ in air.

E. Results

The storage life of the feed was taken as the inflection point of the graph $CO_2$ content of the head space gas vs time, and this corresponded to the rapid increase in the rate of $CO_2$ production as a result of microbial respiration. It is known that there is a logarithimic relationship between storage life and treatment rate and the slope constant, K, of this equation is defined as the (absolute) activity rating of the additive. Propionic acid was used as the standard in these experiments and thus the relative activity rating (RAR) of the test additives was calculated from the ratio ka/kp where ka is the activity rating of the test additive and kp is the activity rating of propionic acid.

Results are presented in Table 1 below.

TABLE 1

| Additive | Treatment Rate % w/w | Storage Life (Days) | Absolute Activity Rating | Relative Activity Rating |
|---|---|---|---|---|
| Experiment 1 | | | | |
| Control + | — | 4.6 | | |
| Propionic acid + | 0.10 | 7.3 | 1.86 | 1.0 |
|  | 0.15 | 9.1 | | |
|  | 0.20 | 10.7 | | |
| BioAdd* + | 0.2 | 6.3 | 0.61 | 0.33 |
|  | 0.4 | 7.6 | | |
|  | 0.6 | 11.0 | | |
| BioAdd* Blend | 0.2 | 7.3 | 1.14 | 0.61 |
|  | 0.4 | 11.8 | | |
|  | 0.6 | 22.2 | | |

*Registered Trade Mark
+ Comparative Tests not according to the invention.

TABLE 2

| Additive | Treatment Rate % w/w | Storage Life (Days) | Absolute Activity Rating | Relative Activity Rating |
|---|---|---|---|---|
| Experiment 2 | | | | |
| Control + | — | 3.9 | | |
| Propionic acid + | 0.10 | 6.2 | 2.6 | 1.0 |
|  | 0.15 | 9.1 | | |
|  | 0.20 | 12.9 | | |
| BioAdd* + | 0.20 | 5.3 | 0.8 | 0.31 |
|  | 0.30 | 6.8 | | |
|  | 0.40 | 8.1 | | |
| BioAdd* Blend | 0.20 | 6.9 | 1.3 | 0.50 |
|  | 0.30 | 10.0 | | |
|  | 0.40 | 12.5 | | |
| Sulphuric acid blend + | 0.20 | 4.8 | 0.5 | 0.19 |
|  | 0.30 | 5.3 | | |
|  | 0.40 | 6.6 | | |

*Registered Trade Mark
+ Comparative Test (not according to the invention)

F. Discussion

Experiments 1 and 2

The results from Experiment 1 clearly indicate that the addition of propionic acid to formic acid significantly improves its effectiveness as a mold inhibitor, the BioAdd Blends having an RAR of 0.61 compared with 0.33 for BioAdd alone.

In Experiment 2, a sulphuric acid/propionic acid mixture was included in the test to ascertain if the enhanced preservative effect of the BioAdd Blends was due solely to a hydrogen ion effect. The results show that this is clearly not the case, the RAR of the sulphuric/propionic mixture (0.19) being essentially the same as the predicted value of 0.20.

Independent Activity

The contribution to storage for each acid is derived from the relationship between additive concentration versus storage life (see Table 1) and the individual times are summed. Thus the BioAdd blend applied at the envisaged (commercial) treatment level of 0.5% would give a theoretical response of 10 days based on the independent contributions from the propionic and formic acids in the mixture. In fact the blend at 0.5% provided an actual storage life of 16 days thus exhibiting synergism with respect to independent activity.

Cooperative Activity

The acids present in the mixture were converted to the equivalent of propionic acid using the relative activity ratings and the storage period for the total equivalent as propionic acid was derived from the propionic acid storage life data in Table 1.

Thus, the propionic acid equivalent of the BioAdd Blend applied at 0.5% is $0.4 \times 0.33 + 0.1 \times 1 = 0.232$ which would give a theoretical response of 13 days. As the actual storage life obtained was 16 days the cooperative activity criterion is also satisfied and hence synergism is proven.

The cooperative contribution can also be seen in terms of the actual and predicted relative activity ratings for the BioAdd blend.

|  | Actual | Predicted |
|---|---|---|
| Experiment 1 | 0.61 | 0.46 |
| Experiment 2 | 0.5 | 0.45 |

Again synergism is established. The data from Experiment 1 are more reliable than those obtained in Experiment 2 because longer storage lives were involved in the former enabling more accurate measurement.

The above Experiments show that the preservative activity of BioAdd can be improved significantly by the incorporation of some propionic acid into the formulation. The BioAdd Blend tested (80/20-BioAdd/propionic acid) also exhibits synergism with respect to mold inhibition using the criteria of both additive and cooperative activity.

EXAMPLES AND COMPARATIVE TESTS
(Experiments 3–6)

The procedures under Experiments 1 and 2 were repeated with a another set of additives but now using poultry feed instead of pig feed (see Table 2).

The test method employed was identical to that described above and the results are tabulated below:

TABLE 3

| FORMULATIONS OF BROILER FEED USED IN BIOADD TRIALS | |
|---|---|
|  | % |
| + Wheat | 64.5 |
| *Meat and bone meal | 4.0 |

TABLE 3-continued

FORMULATIONS OF BROILER FEED USED IN BIOADD TRIALS

| *Feather Offal and Blood meal | 4.0 |
|---|---|
| Fishmeal | 2.5 |
| Soya Meal | 7.1 |
| Full Fat Soya | 11.4 |
| Tallow | 3.8 |
| Dical. Phos. | 0.5 |
| Lysine | 0.04 |
| Methionine | 0.04 |
| Limestone | 0.3 |
| × Supplement | 1.25 |
| Acid Blend | balance |

*Raw materials used as natural source of salmonella.
+ Wheat used as variable to adjust levels of the acid blend.
× Supplement - Pantoribin 555 - contains Avoparcin.

| Exp. | Additive | Level (% w/w) | Storage Life (days) | Relative Activity Rating Expt. | Theoretical |
|---|---|---|---|---|---|
| 3 | (e) BioAdd* + (85% formic) | 0 | 5.3 | 0.18 | — |
|  |  | 0.2 | 7.0 |  |  |
|  |  | 0.4 | 8.1 |  |  |
|  |  | 0.6 | 10.4 |  |  |
| 4 | (f) BioAdd*/ Propionic 80/20 | 0.3 | 10.5 | 0.37 | 0.34 |
|  |  | 0.4 | 13.4 |  |  |
|  |  | 0.5 | 16.0 |  |  |
|  |  | 0.6 | 20.9 |  |  |
| 5 | (g) BioAdd*/ Propionic 90/10 | 0.2 | 8.65 | 0.3 | 0.26 |
|  |  | 0.4 | 10.9 |  |  |
|  |  | 0.6 | 14.8 |  |  |

*Registered Trade Mark
+ Comparative Test not according to the invention.

| Additive No. | Acid Composition Ratio, (Water Free Basis) (% w/w) Formic | Propionic |
|---|---|---|
| (e)* | 100 | — |
| (f) | 77.3 | 22.7 |
| (g) | 88.4 | 11.6 |

*Comparative Test (not according to the invention).

Thus mixtures (f) and (g) both exhibit synergism using the criterion of cooperative activity which demands a high level of performance in view of the logarithmic relationship that exists between concentration of additive and storage life.

EXPERIMENT 7

A chick starter mash was contaminated with a nalidixic acid resistant strain of *Salmonella kedougou*. Either 5 ml of a $10^{-4}$ or a $10^{-5}$ dilution of an overnight broth culture was mixed into 25 kg food using 500 g of coconut as a premix to give initial infection rates of 17 and 1.7 *S. kedougou*/g food respectively.

Five bags of each Salmonella inclusion rate were prepared. One was kept as a control (Diet 1) while one was treated with either 0.5% w/w of 85% formic acid (Diet 2) or 0.5% w/w of a blend comprising 80 parts of 85% formic acid and 20 parts of propionic acid (Diet 3).

One day-old birds of mixed sex were purchased. Ten chicks were placed in each of five fibre-glass tubs in each of two rooms. One was designated for the low infection level diet and the other for the high level diet with each group of 10 birds receiving different diets. The food and also water was available ad lib.

A swab of cloacal feces was obtained from each bird immediately on arrival and then each week until slaughter at 3 weeks of age. These were used to inoculate brilliant green phenol red agar (Lab M34) supplemented with nalidixic acid (30 g/ml). When the birds were 21 days of age they were killed, weighed and the number of S. kedougou in the caecal contents determined.

RESULTS

The Isolation Rate of Salmonella kedougou from Swabs of Cloacal Feces,

| Inclusion Rate of Salmonella (organisms/ g. food) | Diet No. | Age of Birds (weeks) 0* | 1 | 2 | 3 | Total Weeks 1-3 (%) |
|---|---|---|---|---|---|---|
| 17 | 1 | 0/10 | 9/10 | 9/10 | 9/9 | 27/29 (93) |
|  | 2 | 0/10 | 1/10 | 10/10 | 10/10 | 21/30 (70) |
|  | 3 | 0/10 | 0/10 | 0/10 | 0/10 | 0/30 (0) |
| 1.7 | 1 | 0/10 | 8/10 | 9/10 | 10/10 | 27/30 (90) |
|  | 2 | 0/10 | 0/10 | 0/10 | 1/10 | 1/30 (3) |
|  | 3 | 0/10 | 0/10 | 0/10 | 0/10 | 0/30 (0) |

*Sampled immediately on arrival from hatchery.

Average Salmonella kedougou counts (log) in the Caecal Contents of Birds Fed Experimentally Contaminated Food for 3 weeks

| Inclusion rate of S. kedougou (organisms/g food) | Diet 1 | Diet 2 | Diet 3 |
|---|---|---|---|
| 17 | 6.49 | 6.37 | 0.07 |
| 1.7 | 6.22 | 0.54 | 0.00 |

The results clearly show that the acid mixture of the invention is a more potent inhibitor of salmonella infection than formic acid alone which has hitherto been believed to be the most effective of the lower carboxylic acids.

We claim:

1. A preservative composition for animal feedstuffs said composition comprising a binary blend of formic acid and propionic acid characterised in that the amount of propionic acid in the blend is from 10-23% w/w of the total blend.

2. A preservative composition according to claim 1 wherein the blend is used as an aqueous solution thereof.

3. A preservative composition according to claim 2 wherein said blend contains formic acid, propionic acid and water in a proportion of 68:20:12 respectively by weight.

4. A preservative composition according to claim 1 wherein the blend is used in a solid form whereby it is impregnated on a solid carrier.

5. A preservative composition according to claim 1 wherein said composition is applied to the feedstuff in an amount corresponding to 0.2-5% by weight of the blend based on the total feedstuff preserved.

6. A process for preserving an animal feed selected from pig feed, cattle feed and poultry feed, wherein a preservative composition comprising a binary blend of formic acid and propionic acid according to claim 1 is applied to said feed in an amount corresponding to 0.1 to 10% w/w of the blend based on the total feed preserved.

7. A preserved animal feed composition comprising an animal feedstuff containing a salmonella infection inhibitor,
    said inhibitor comprising a binary blend of formic acid and propionic acid characterised in that the amount of propionic acid in the blend is from 10 to 23% w/w of the total blend, and wherein said inhibitor is applied to the feedstuff in an amount corresponding to 0.2–5% by weight of the blend based on the total feedstuff preserved.

8. The preserved composition of claim 7, which is a poultry feed composition.

9. A process for preserving an animal feed selected from pig feed, cattle feed and poultry feed against salmonella infection comprising applying to said feed a salmonella infection inhibitor comprising a binary blend of formic acid and propionic acid in an amount corresponding to 0.2 to 5% w/w of the blend based on the total feed preserved, said binary blend of formic acid and propionic acid characterised in that the amount of propionic acid in the blend is from 10–23% w/w of the total blend.

10. The process of claim 9, wherein the animal feed is poultry feed.

* * * * *

UNITED STATES PATENT AND TRADEMARK OFFICE
CERTIFICATE OF CORRECTION

PATENT NO.   :   4,824,686

DATED        :   April 25, 1989

INVENTOR(S)  :   Michael Dunn et al

It is certified that error appears in the above-identified patent and that said Letters Patent is hereby corrected as shown below:

Col. 3, l. 19, correct spelling of "...logarithmic..."

Col. 5, lines 19 and 20, the data should read in the rows as follows:

```
    0         5.3
    0.2       7.0       0.18
```

Col. 5, lines 23 and 24, data should read as follows:

```
    0.3       10.5
    0.4       13.4      0.37      0.34
```

Col. 5, line 62, should read "...cloacal faeces..."

Col. 6, line 4, should read "...Cloacal Faeces..."

Signed and Sealed this

Twenty-third Day of January, 1990

Attest:

JEFFREY M. SAMUELS

Attesting Officer    Acting Commissioner of Patents and Trademarks